United States Patent [19]

Vogel

[11] Patent Number: 5,038,125
[45] Date of Patent: Aug. 6, 1991

[54] VALVE BLOCK FOR A SLIP-CONTROLLED HYDRAULIC BRAKE SYSTEM

[75] Inventor: Guenther Vogel, Frankfurt am Main, Fed. Rep. of Germany

[73] Assignee: Alfred Teves GmbH, Frankfurt am Main, Fed. Rep. of Germany

[21] Appl. No.: 414,053

[22] Filed: Sep. 28, 1989

[30] Foreign Application Priority Data

Oct. 1, 1988 [DE] Fed. Rep. of Germany ....... 3833474

[51] Int. Cl.[5] .............................................. H01H 9/02
[52] U.S. Cl. ..................................... 335/202; 336/192
[58] Field of Search ...................... 251/129.01, 129.09, 251/129.15, 192.22; 336/192; 335/202

[56] References Cited

U.S. PATENT DOCUMENTS

| | | | |
|---|---|---|---|
| 3,815,077 | 6/1974 | Anhalt et al. | 339/17 R |
| 3,874,768 | 4/1975 | Cutchaw | 339/17 R |
| 4,484,170 | 11/1984 | Wirth et al. | 336/192 |
| 4,591,951 | 3/1986 | Iwamoto et al. | 361/417 |
| 4,898,360 | 2/1990 | VonHayn et al. | 251/129.15 |

Primary Examiner—Leo P. Picard
Assistant Examiner—Lincoln Donovan
Attorney, Agent, or Firm—Robert P. Seitter; J. Gordon Lewis

[57] ABSTRACT

A valve block for a slip-controlled hydraulic brake system, comprising valve domes (10) incorporating magnet coils (7), having insulating casings (6) cast around the magnet coils (7). A conducting-path housing (1) containing several conducting paths (2) are provided wherein the magnet coils (7) are electrically connected to the conducting paths (2) by means of spring contacts (9). To avoid soldering of coil and conducting paths as well as the catch-type securement of the housing cover, an elastic spring contact is fastened between magnet coil and coil jacket which, instead of a soldered joint, provides the electrical connection to the conducting path. The arrangement obviates the need for the complicated mounting of a separate housing cover, since due to the construction and jointing method component parts of the valve block are encapsulated by the external housings.

9 Claims, 1 Drawing Sheet

VALVE BLOCK FOR A SLIP-CONTROLLED HYDRAULIC BRAKE SYSTEM

BACKGROUND OF THE INVENTION

The present invention relates to a valve block for a slip-controlled hydraulic brake system.

A valve block of this type is known from published German patent application P 37 01 019.0. The external housing of the valve block is fixed by a catch-type arrangement in this design. The conducting paths and the magnet coils are soldered, and a group of cables extend through the opening of a housing cover to connect to a control unit. The known catch-type securement of the housing cover as well as the soldering of the coils and the conducting paths is disadvantageous in that the comparatively great expenditure entailed for soldering the conducting paths and the coils adversily impacts the manufacturing cost. Moreover, the complicated assembly of the housing in a conventional valve block design also is disadvantageous.

SUMMARY OF THE INVENTION

Therefore, it is an object of the present invention to improve a valve block of the type described thereby to avoid the aforementioned shortcoming referred to above. Further considerable simplification of the connecting technology is achieved while a modular design ease of repair are provided. An advantageous embodiment of the present invention comprises several serially arranged conducting paths forming a compact plug assembly with a water-proof quick-action lock.

In an alternative embodiment, a further improvement provides that the punctiform surface contact of conducting path and convex-curved spring contact is replaced by a surface-shaped configuration of the spring contact which is formed geometrically plane in the contact area. Likwise a concavely shaped spring contact can be utilized which, due to its multi-point contacting on the conducting path, is provided for the purpose of improved current transmission. The arrangement of the individual fitting surfaces permits the use of liquid packing media instead of using profiled seals.

BRIEF DESCRIPTION OF THE DRAWING

An embodiment of the present invention is described in greater detail in the following description taken in condjunction with the accompanying drawng in which.

DETAILED DESCRIPTION

Figure 1:
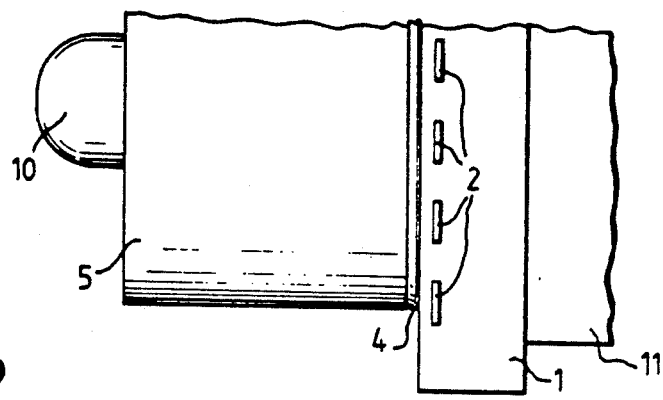
FIG. 1 is a partial view of the valve block on an enlarged scale.

In FIG. 1, the outside surfaces of the valve block are cast with several rectangular connecting tabs of the conducting paths 2, which tabs protrude vertically to the drawing plane from the conduction-path housing 1 and which are disposed transversely to the solenoid valve axis of symmetry in one line in the conducting-path housing 1. This conducting-path housing 1 is confined by the valve block 11 on one side, that is on the right hand in the drawing, while the O-ring 4 seals off the external housing 5 relative to the conducting-path housing 1 on the opposite side. The rounded-off end of a valve dome 10 projects on the left-hand boundary of the pressed-on external housing 5.

Figure 2:
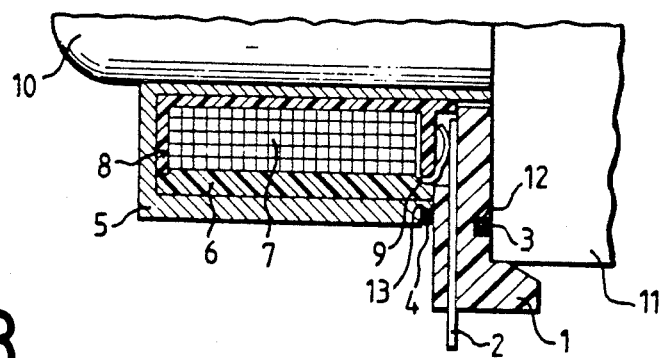
FIG. 2 is a view of the valve block in partial cross-section.

In the sectional illustration of FIG. 2, a partial cross-section of the valve block is shown which is composed of a centrically arranged valve dome 10 that is undetachably connected to the valve block 11. Seated on the valve block 11 is the conducting-path housing with a ring seal 3 provided in a circumferential groove 12. Embedded in the conducting-path housing 1, the conducting path 2 touches a spring contact 9, the spring contact 9 being encompassed by an end surface of the magnet coil 7,. a radially protruding part of the coil jacket 8 and the insulating casing 6, which is partially in operative and positive engagement therewith. The external housing 5 encapsulates the insulating casing 6 in an axial extension relative to the axis of symmetry of the magnet coil 7, while the O-ring 4 seals off the external housing relative to the conducting-path housing 1 at step 13.

Figure 3:
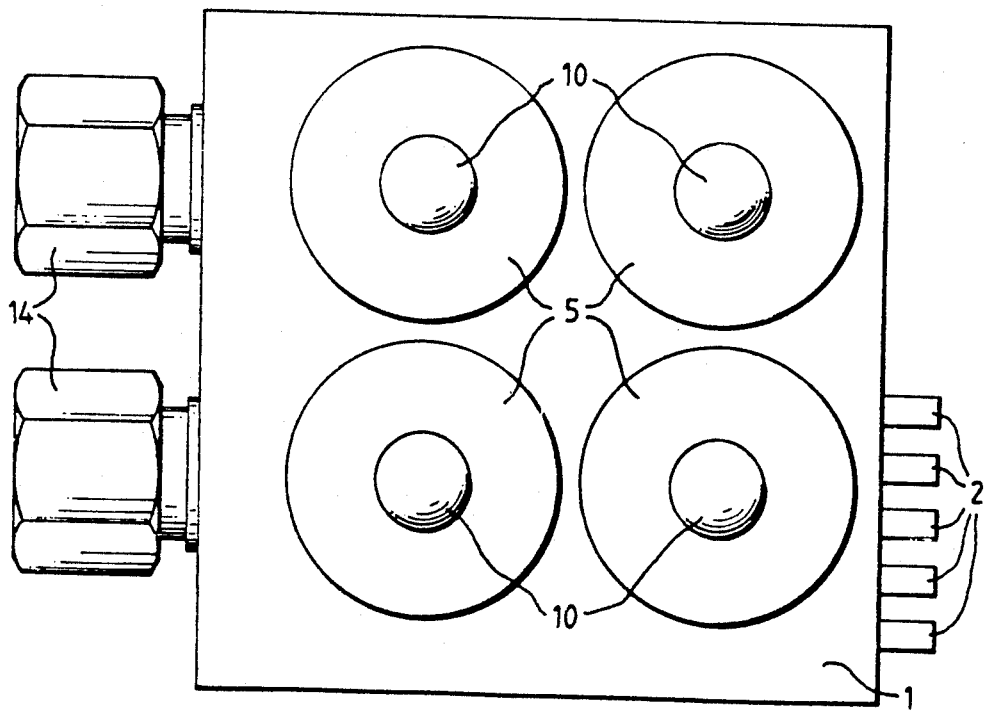
FIG. 3 is a top view on the valve block.

In the top view on the valve block in FIG. 3, four cylinder-shaped valve domes 10 are illustrated which protrude in equal distance from the drawing plane and out of the enclosing external housing 5, while simultaneously the external housing 5 are pressed on the square conducting-path housing 1. On one side of the valve block, that is on the right-hand side as illustrated in the drawing, five tab-shaped conducting paths 2 project form the lateral surface of the conducting-path housing 1, while two pressure-fluid screw couplings 14 serve the valve block for connecting two pressure-fluid lines on the opposite side.

What has been taught, then, is a valve block for a slip-controlled hydraulic brake system facilitating, notably, a substantially reduced cost for the construction and repair thereof.

What is claimed is:

1. A valve block for a slip-controlled hydraulic brake system, comprising in combination: valve domes incorporating magnet coils with insulating casing cast around the magnet coils and a conducting-path housing containing several conducting paths, wherein elastic spring contacts (9) respectively are clamped in between end surfaces of the magnet coils (7) and radially projecting portions of the coil jackets (8) adjacent to the insulating casings and contact the conducting paths (2).

2. A valve block as claimed in claim 1, wherein conducting paths (2) which extend in the conducting-path housing (1) transversely to the longitudinal axis of the valve domes (10) engage the spring contacts (9), and wherein the conducting-path housing (1) is in surface-pressure contact with the parallel surfaces of the valve block (11) and the external housing (5).

3. A valve block as claimed in claim 2, wherein O-rings (A) serve to seal several steps (13) of the external housing (5) in relation to the conducting-path housing (1) at the periphery of the contacting surfaces.

4. A valve block as claimed in claim 3, wherein the force-locking elastic spring contacts (9) are held in positive and operative engagement between the hollow-cylinder-shaped magnet coils (7), which are directed in the solenoid valve longitudinal axis and the coil jackets (8).

5. A valve block as claimed in claim 4, wherein the insulating casings (6) cast around the valve coils (7) encompass the valve coils (7) in axial extension relative to the central axis of the valve dome.

6. A valve block as claimed in claim 5, wherein two parallel arranged spring contacts are connected and soldered with each one wire end of the magnet coils (7)

and constitute the current circuit to the conducting paths (2).

7. A valve block as claimed in claim 6, wherein extending over the external housings (5) in axial direction of the valve dome axes of symmetry of the valve block provide an operative connection with the valve domes (11) serially arranged in one plane each.

8. A valve block as claimed in claim 7, wherein surface pressure is exerted between the boundaries of the external housing (5), the insulating casings (6) and the coil jackets (8) caused by a force that is directed to the conducting-path housing in parallel to the valve dome axes of symmetry, which surface pressure leads to parallel shift and release of the magent coils (7) when the force acts in opposite direction.

9. A valve block as claimed in claim 8, wherein the jointing construction of the magnet coils (7) provides a detachable connection of the conducting-path housing (1), the seals (3), O-rings (4) of the external housings (5), coils jackets (8) and spring contacts (9).

* * * * *